2,744,023

ADHESIVE COMPOSITION

Siegfried Glaubert, Le Pecq, France

No Drawing. Application March 5, 1952,
Serial No. 275,010

4 Claims. (Cl. 106—148)

This invention relates to casein glue compositions, and has for its primary object the provision of a casein glue composition of decreased heat-hardening time and a low water vapor pressure and which, moreover, when used to form glued joints is highly resistant to exposure to heat and moisture. In particular, this invention consists in the addition of the combination of crude calcium cyanamide and calcium carbonate to the casein.

Casein forms the base of many glues commonly used on wood, leather, fabrics and other materials. These glues are commonly marketed as a powder, to be mixed with cold water to form a creamy paste just prior to the gluing operation. Within a relatively short time, the paste hardens to a solid adhesive film and attains maximum strength at room temperature within a day or two. Frequently, especially in commercial gluing operations, the glue is heated to accelerate the hardening process.

A serious disadvantage of casein glues is that they do not resist the effects of heat and moisture. A plywood, for instance, laminated with casein readily delaminates when boiled in water. A further undesirable characteristic of these glues that is frequently experienced is the vaporization of water when heat is applied to accelerate the hardening. This causes the formation of vapor pockets which separate the adhesive film between abutting surfaces.

The present invention is based on the discovery that combining with casein, small intimately admixed amounts of crude calcium cyanamide and calcium carbonate, produces an adhesive composition which may be caused to harden by the application of heat at a much faster rate and without the formation of vapor pockets. Moreover, joints adhesively combined with this improved casein composition may be exposed to moist heat without separating, for instance, they may be boiled in water or exposed to live steam.

Crude calcium cyanamide is the product obtained by heating calcium carbide and nitrogen in an electric furnace. It is frequently marketed under the name "Lime Nitrogen" and has the following approximate analysis:

| | Per cent |
|---|---|
| CaNCN | 57–68 |
| Ca(OH)$_2$ | 16 |
| CaO | 4 |
| Graphite | 14 |
| Silica and alumina | 3 |

Satisfactory results may be attained by combining the ingredients in the following range of proportions:

| | Parts by weight |
|---|---|
| Protein adhesive material including at least ⅓ casein by weight | 100 |
| Crude calcium cyanamide | 13–55 |
| Calcium carbonate | 25–100 |

These ingredients should be combined in the form of powders or fine granules with the crude calcium cyanamide and at least a part of the calcium carbonate in intimate admixture such as is obtained by milling these materials together. The casein, crude calcium cyanamide, and calcium carbonate may be mixed together and ground in a ball mill to pass a 70 mesh screen, or, the crude calcium cyanamide and at least a small fraction of the calcium carbonate, for instance, as little as 10%, based on the weight of cyanamide, may be ball-milled together, then added with the remainder of the calcium carbonate to the casein material and mixed in by ordinary methods. The casein material may consist entirely of casein or may contain up to two-thirds by weight of other protein adhesive materials such as blood albumin, soya bean protein and similar materials. In this connection, it has been found that the presence of cellulosic material in certain protein adhesive materials decreases the maximum amount of such other protein adhesives that may be added.

The adhesive composition of the present invention in powdered form, is prepared for use by mixing it with water in an amount between 250 and 600 parts of water per 100 parts of dry adhesive material. A satisfactory method of mixing the adhesive composition with water, is to place the powdered material in a suitable container, then cover it completely with a part of the total water to be added. The powder and water are then allowed to stand without mixing until the mixture thickens to uniform consistency throughout. The rest of the water is then added slowly and mixed into the adhesive mixture. It has been found that if the water initially added to the adhesive material is stirred in to accelerate the mixing, foaming results and much of the efficacy of the adhesive is lost. It is accordingly desirable to maintain the amount of water initially added at a minimum by just covering the powder with water and to add the remainder of the water under the more rapid mixing conditions incidental to stirring. If desired, however, all the water required may be added to the powder at once, and the combination allowed to stand until it is of uniform consistency.

After the powder has been combined with water, it is ready for use. Mating surfaces to be combined adhesively may be coated with the adhesive material and held in place in tight compressional relationship until the adhesive hardens, and if desired, the adhesive may be heated to accelerate hardening. Various extenders may also be added to the adhesive composition after it has been mixed with water. A preferred extender is wood flour but other well-known similar materials may also be added.

The following examples have been selected to illustrate preferred embodiments of this invention.

EXAMPLE I

| | Parts by weight |
|---|---|
| Casein | 15 |
| Crude calcium cyanamide | 4 |
| Calcium carbonate | 7 |

The ingredients were combined, then ground in a ball mill to pass a 70 mesh screen. The powdered mixture was then placed in a beaker and one and one-half times its weight of water was added to it. After about 10 minutes, the mixture had thickened to a uniform consistency throughout its volume. An additional amount of water equal to the amount originally added, was then stirred into the mixture. The resulting adhesive composition was entirely satisfactory for use for 2 hours. It was applied between the adjacent surfaces of wood laminae of Douglas fir in the preparation of plywood. The laminae were pressed between the heated platens of a press and heated to about 110° C. for about 3½ minutes. This heat treatment resulted in complete hardening of the adhesive without the formation of any vapor spaces between the laminae. It will be apparent from the foregoing description, that the adhesive material of the present invention may be hardened by heat in a fraction of the time required of casein glue compositions heretofore known. The plywood thus formed was boiled in water for 6 hours and no delamination was apparent.

EXAMPLE II

*Preparation of a pre-mixed calcium cyanamide-calcium carbonate mixture for addition to casein*

| | Parts by weight |
|---|---|
| Crude calcium cyanamide | 82 |
| Calcium carbonate | 10 |
| Iron oxide (Fe₂O₃) (optional) | 8 |

The ingredients were combined and mixed in a ball mill to pass a 90 mesh screen. This mixture may now be added to casein or other protein adhesive material containing at least one-third casein, along with the additional calcium carbonate required in the adhesive composition, by ordinary mixing methods. For example,

| | Parts by weight |
|---|---|
| Casein | 15 |
| Calcium carbonate | 7 |
| Calcium cyanamide-calcium carbonate mixture | 4 |

These ingredients are mixed together, dry, without milling and may be combined with water and used in the manner described in Example I. The presence of the iron oxide in the calcium cyanamide-calcium carbonate mixture, is for coloring purposes, and may be omitted if desired.

In using the casein glue composition of this invention on wooden joints, best results are attained with the relatively soft porous woods such as fir, hemlock, spruce, poplar and others, which allow penetration of the glue into the fibrous wood structure. Hard, dense woods, such as birch, oak and maple, may not allow sufficient penetration of the glue to form a joint resistant to boiling water unless penetrating agents e. g. alcohol, are added to the glue.

Having thus disclosed my invention, and described in detail preferred embodiments thereof, I claim and desire to secure by Letters Patent:

1. An improved casein glue composition characterized by resistance to heat and moisture, rapid hot cure, and freedom from water vaporization comprising protein adhesive material including at least one-third by weight of casein, from 25 to 100 per cent on protein adhesive of calcium carbonate and from about 14 to 55 per cent on adhesive of crude calcium cyanamide in intimate admixture with at least a part of the calcium carbonate.

2. An improved casein glue composition characterized by high resistance to heat and moisture, rapid hot cure and low vapor pressure when mixed with water comprising protein adhesive material including at least one-third casein by weight, about 44 per cent calcium carbonate on weight of protein adhesive and about 26 per cent on weight of protein adhesive material of approximately the following analysis:

| | Per cent |
|---|---|
| CaNCN | 57–68 |
| Ca(OH)₂ | 16 |
| CaO | 4 |
| Graphite | 14 |
| Silica and alumina | 3 | said ingredients being finely divided and in intimate admixture.

3. An improved casein glue composition characterized by high resistance to heat and moisture, rapid hot cure and low vapor pressure when mixed with water comprising 100 parts by weight of a mixture comprising protein adhesive material including at least one-third by weight of casein, from 25 to 100 per cent on protein adhesive of calcium carbonate and from about 14 to 55 per cent on protein adhesive of crude calcium cyanamide in intimate admixture with at least a part of the calcium carbonate, and from 250–600 parts by weight of water.

4. A method of making a casein glue composition comprising (1) providing a finely divided mixture comprising protein adhesive material including at least one-third by weight of casein, from 25 to 100 per cent on protein adhesive of calcium carbonate and from about 14 to 55 per cent on protein adhesive of crude calcium cyanamide in intimate admixture with at least a part of the calcium carbonate, (2) adding water thereto in an amount sufficient to cover said mixture, (3) allowing said water and mixture to intermix without substantial stirring until the mixture is of relatively uniform consistency throughout its volume, (4) then adding water in an amount sufficient to bring the total water to between 250 and 600 per cent based on the weight of adhesive material.

References Cited in the file of this patent

UNITED STATES PATENTS

| 973,019 | D'Ercole | Oct. 18, 1910 |
| 1,155,797 | Cooper | Oct. 5, 1915 |
| 2,103,153 | Dunham | Dec. 21, 1937 |
| 2,214,565 | Montgomery et al. | Sept. 10, 1940 |
| 2,238,949 | Schlack | Apr. 22, 1941 |
| 2,247,353 | Auer | July 1, 1941 |
| 2,581,112 | Landes et al. | Jan. 1, 1952 |
| 2,613,155 | White | Oct. 7, 1952 |

OTHER REFERENCES

The Technology of Adhesives Del Monte, Reinhold Publishing Corp. Copyright 1947, page 258.